(12) United States Patent
Liarte et al.

(10) Patent No.: US 10,928,876 B2
(45) Date of Patent: Feb. 23, 2021

(54) REMOVABLE UNIT IN AN ADDITIVE MANUFACTURING SYSTEM

(71) Applicants: HEWLETT-PACKARD DEVELOPMENT COMPANY, L.P., Houston, TX (US); Noel Liarte, Sant Cugat del Valles (ES); Anna Torrent, Sant Cugat del Valles (ES); Juan Manuel Zamorano, Sant Cugat del Valles (ES)

(72) Inventors: Noel Liarte, Sant Cugat del Valles (ES); Anna Torrent, Sant Cugat del Valles (ES); Juan Manuel Zamorano, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 158 days.

(21) Appl. No.: 16/095,899

(22) PCT Filed: Jul. 12, 2016

(86) PCT No.: PCT/EP2016/066567
§ 371 (c)(1),
(2) Date: Oct. 23, 2018

(87) PCT Pub. No.: WO2018/010774
PCT Pub. Date: Jan. 18, 2018

(65) Prior Publication Data
US 2019/0129484 A1 May 2, 2019

(51) Int. Cl.
G06F 1/26 (2006.01)
B33Y 30/00 (2015.01)
(Continued)

(52) U.S. Cl.
CPC ............ *G06F 1/263* (2013.01); *B22F 3/1055* (2013.01); *B29C 64/153* (2017.08); *B29C 64/20* (2017.08);
(Continued)

(58) Field of Classification Search
CPC ... H02J 9/06; H02J 9/061; H02J 7/025; G06F 1/263; G06F 1/30; G06F 1/3287;
(Continued)

(56) References Cited

U.S. PATENT DOCUMENTS 5,001,623 A 3/1991 Magid
7,785,093 B2 8/2010 Holmboe et al.
(Continued)

FOREIGN PATENT DOCUMENTS

EP 2349682 A2 8/2011

OTHER PUBLICATIONS

"ProMaker P1000: Industrial Performance Made Accessible"; Retrieved from the internet on Jun. 8, 2016; http://www.prodways.com/en/printer/promaker-p1000/.

Primary Examiner — Bryan R Perez
(74) Attorney, Agent, or Firm — HP Inc. Patent Department

(57) ABSTRACT

Certain examples described herein relate to a removable unit of an additive manufacturing system. The removable unit is connectable to a base unit. When connected and operational, the base unit supplies a first voltage to the removable unit via a first power coupling. The removable unit has a power supply unit that converts the first voltage to a second voltage. The second voltage may power a number of low voltage components. The removable unit also has a power multiplexer. When the first voltage is unavailable the remov-
(Continued)

able unit switches the power multiplexer to use a second voltage that is supplied from the base unit via a second power coupling.

20 Claims, 3 Drawing Sheets

(51) Int. Cl.
*B33Y 40/00* (2020.01)
*B29C 64/153* (2017.01)
*B29C 64/20* (2017.01)
*B22F 3/105* (2006.01)
*B29C 64/393* (2017.01)
*B29C 64/165* (2017.01)

(52) U.S. Cl.
CPC ............ *B29C 64/393* (2017.08); *B33Y 30/00* (2014.12); *B33Y 40/00* (2014.12); *B22F 2003/1056* (2013.01); *B29C 64/165* (2017.08); *Y02P 10/25* (2015.11)

(58) Field of Classification Search
CPC .......... G06F 1/061; G06F 1/26; H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 2003/1566; H02M 2003/1557; H02M 2001/0012; H02M 2001/0009; H02M 2001/385; H02M 1/12; H02M 1/42; H02M 1/4225; H02M 1/4233; H02M 1/4241; H02M 1/4258; H02M 1/425; H02M 1/4208; H04B 2215/069

See application file for complete search history.

(56) References Cited

U.S. PATENT DOCUMENTS

| | | | |
|---|---|---|---|
| 7,790,096 | B2 | 9/2010 | Merot et al. |
| 8,105,527 | B2 | 1/2012 | Wahlstrom |
| 2009/0296953 | A1* | 12/2009 | Sakata ............... G10H 1/06 381/80 |
| 2014/0085620 | A1 | 3/2014 | Lobovsky et al. |
| 2015/0069665 | A1 | 3/2015 | Lee |
| 2016/0118827 | A1* | 4/2016 | Borngraber ......... H02J 7/0036 320/103 |
| 2017/0139469 | A1* | 5/2017 | Stewart ............... G06F 1/3296 |

* cited by examiner

REMOVABLE UNIT IN AN ADDITIVE MANUFACTURING SYSTEM

BACKGROUND

Additive manufacturing systems, including those commonly referred to as "3D printers", build three-dimensional (3D) objects from selective addition of build material. In an example system, build material is formed in layers in a working area. Chemical agents, referred to as "printing agents", are selectively deposited (e.g. "printed") onto each layer within the working area. In one case, the printing agents may comprise a fusing agent and a detailing agent. In this case, the fusing agent is selectively applied to a layer in areas where particles of the build material are to fuse together, and the detailing agent is selectively applied where the fusing action needs to be reduced or amplified. For example, a detailing agent may be applied to reduce fusing at an object boundary to produce a part with sharp and smooth edges. Following the application of printing agents, energy is applied to the layer. This results in the fusion of particles of build material in accordance with the pattern or patterns of printed agents. The process is then repeated for another layer, such that objects are built from a series of cross-sections.

Additive manufacturing systems such as those described above may comprise a wide range of different electrical and electro-mechanical systems. These systems may be distributed across different removable units. For example, a printing system for depositing printing agents may be housed in one unit and a build material supply system may be housed in another unit. These units may then be removably coupled, e.g. the build material supply system may be removed for refill and/or cooling operations yet coupled for the building of objects.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Figure 1A:
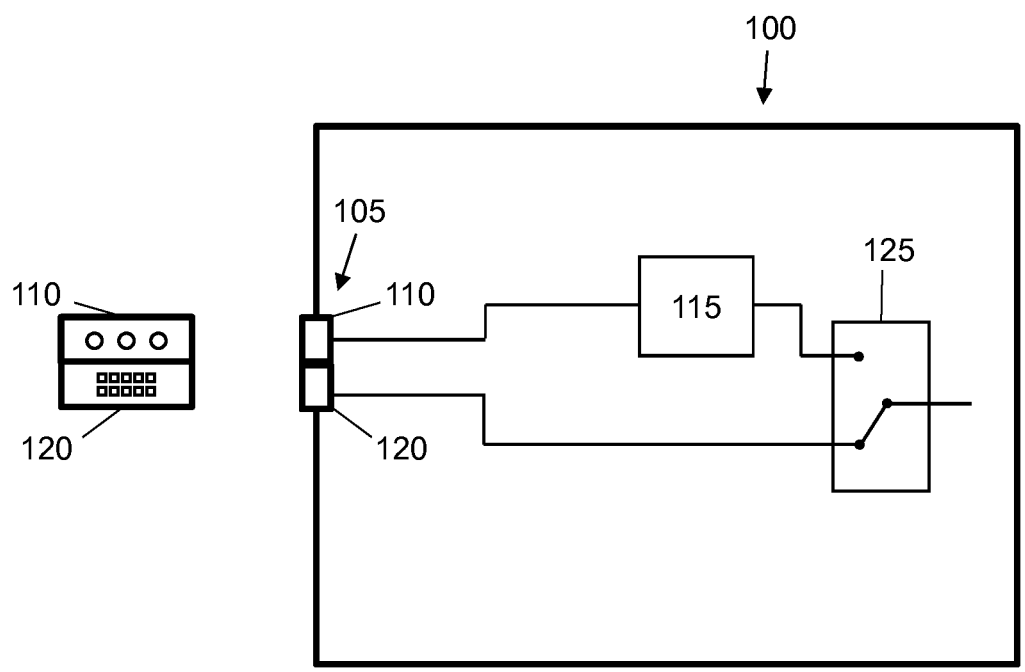
FIGS. 1A to 1D show schematic representations of a removable unit for an additive manufacturing system according to an example.

Certain examples described herein relate to additive manufacturing systems that comprise a removable unit connectable to a base unit. For example, a base unit may comprise a printing system for depositing printing agents and a removable unit may comprise a build material supply system and/or a build platform upon which an object is constructed. Alternatively or additionally, the removable unit may comprise at least one of: a heating system for supplying energy during additive manufacturing; a vacuum system for controlling, collecting and/or recycling build material particles; and a cooling system for cooling an object following additive manufacturing. The removable unit may be coupled to the base unit during additive manufacturing, or may be coupled to the base unit before and/or after additive manufacturing. For example, a build material supply system may be coupled before additive manufacturing, a heating system may be coupled during additive manufacturing, and a cooling system may be coupled after additive manufacturing.

In certain cases, the base unit may be static, e.g. arranged to operate in one position and location, whereas the removable unit may be moveable, e.g. may comprise castors or be arranged to be removed and lifted by hand.

The removable units described above may comprise electrical or electro-mechanical components such as heating elements, vacuum systems, sensors and actuators that are operable at high voltages, e.g. mains voltages having a voltage of 440 or 240 Volts. As the removable unit may be removed, it is practical to power the unit from the base unit, rather than use a separate independent power supply. As such, the base unit may comprise a power source for powering the removable unit, such that the electro-mechanical components of the removable unit receive power from the base unit when the removable unit is connected to the base unit. In certain cases, the base unit supplies alternating current (AC) at a mains voltage to the removable unit. A power supply such as this is may be switched on at the base unit after connecting the removable unit, and switched off at the base unit before disconnecting the removable unit. Making sure a base unit power supply is switched off before connecting or disconnecting the removable unit avoids connecting the removable unit directly to a high voltage supply, which is known as "hot plugging" and which may damage powered components of the removable unit. A risk of damage may arise when the removable unit is connected ("hot plugging") and disconnected ("hot unplugging"). In one case, damage may occur when high voltage components are operating and the high voltage source is removed (e.g. by physically removing the unit). For example, if a high current is being drawn and a physical connector is disconnected, this can cause damage to at least the connector. In another case, damage may occur when a component is not in a suitable state to be powered up, e.g. if a removable electrical component is not present or if a mechanical component is misaligned. In this case, manual intervention and/or an automated correction procedure is recommended to readjust the additive manufacturing system before power is provided.

Certain examples described herein reduce the risks associated with powering a removable unit by providing a second power coupling to the base unit at a low voltage, the second power coupling being in addition to a power coupling to the base unit at a high voltage, e.g. a mains power coupling. The low voltage is a voltage that has a value below that of the high voltage, e.g. the high voltage may be a mains voltage at 240 Volts and the low voltage may, for example, be between 3 and 12 Volts. Similarly, the high voltage is a voltage that has a value above that of the low voltage. As such the terms "low" and "high" are used relatively. A power multiplexer is provided to switch between a low voltage power line electrically connected to the second power coupling and a power supply unit of the removable unit that is electrically connected to the power coupling at the high voltage. As such, when the removable unit is connected to the base unit and the base unit power is off, low voltage electrical systems on the removable unit can operate. These low voltage electrical systems can then be switched to use the power supply unit once the base unit power is switched on. This then allows a staggered start-up procedure where the low voltage electrical system can operate before a high voltage supply is connected. If there is a problem with a high voltage power supply, this can be determined by the low voltage electrical systems before they are electrically coupled to such a supply. In one case, a relay may be used to connect or disconnect (i.e. enable or disable) a mains power supply based on an output of the low voltage electrical systems. Hence, power-up or power-down procedures may be performed without the mains power supply.

In certain cases, the low voltage electrical systems comprise a diagnostic system that may operate using the low voltage power supply before a high voltage power supply is switched on. The diagnostic system may provide feedback about the state of removable unit components (e.g. heating, vacuum, supply or cooling systems) in order to detect problems after physically connecting the removable unit to the base unit but before connecting the high voltage supply. The diagnostic system may confirm that the aforementioned removable unit components are functioning correctly. As an example, the mains power supply may be enabled or disabled (e.g. via a relay) after the diagnostics complete successfully and/or a configuration of high voltage components may be checked following disconnection of a mains power supply but before physical disconnection of the removable unit. This improves the safety and reliability of the system.

The diagnostics may comprise routines to obtain a state of at least one sensor and/or actuator within the removable unit and to compare the obtained state with a safe operational state. Similar, the diagnostics may comprise polling at least one electronic component, either within the removable unit or the base unit, to determine whether communication is possible. For example, a temperature of an energy source may read from a thermistor and compared to a predefined "safe" startup range. Alternatively (or additionally), the diagnostics may check that the removable unit can communicate successfully with a controller of the base unit, e.g. successfully receive an acknowledgement message in reply to a polling message. Another routine may comprise receiving a success flag from a vacuum subsystem of the removable unit, wherein the vacuum subsystem comprises its own embedded controllers to diagnose vacuum components and read sensor states.

Figure 1B:
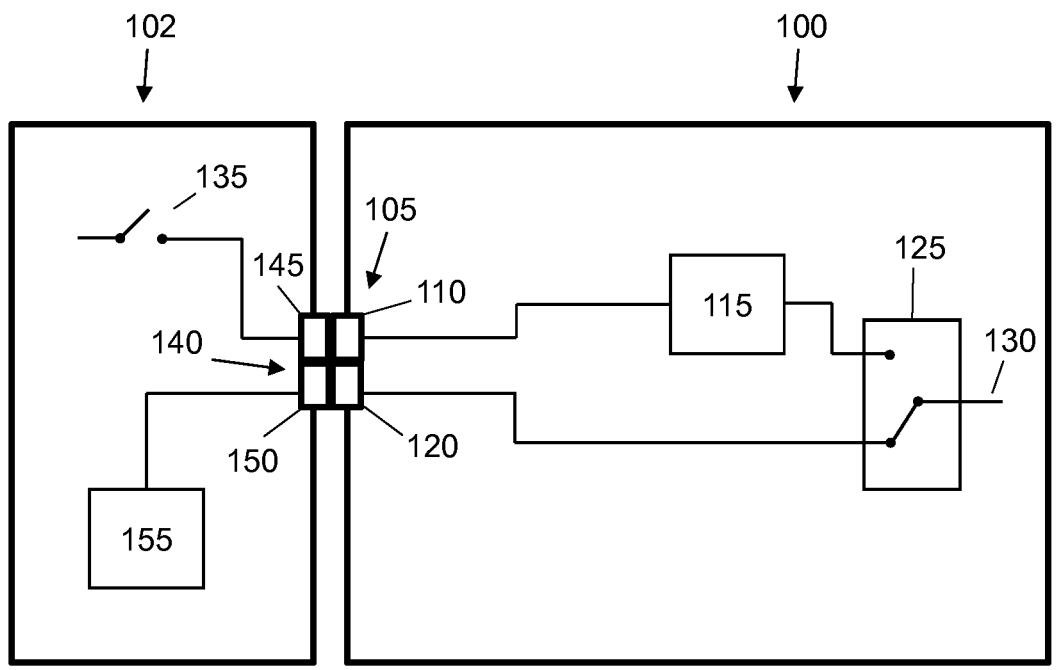
Figure 1C:
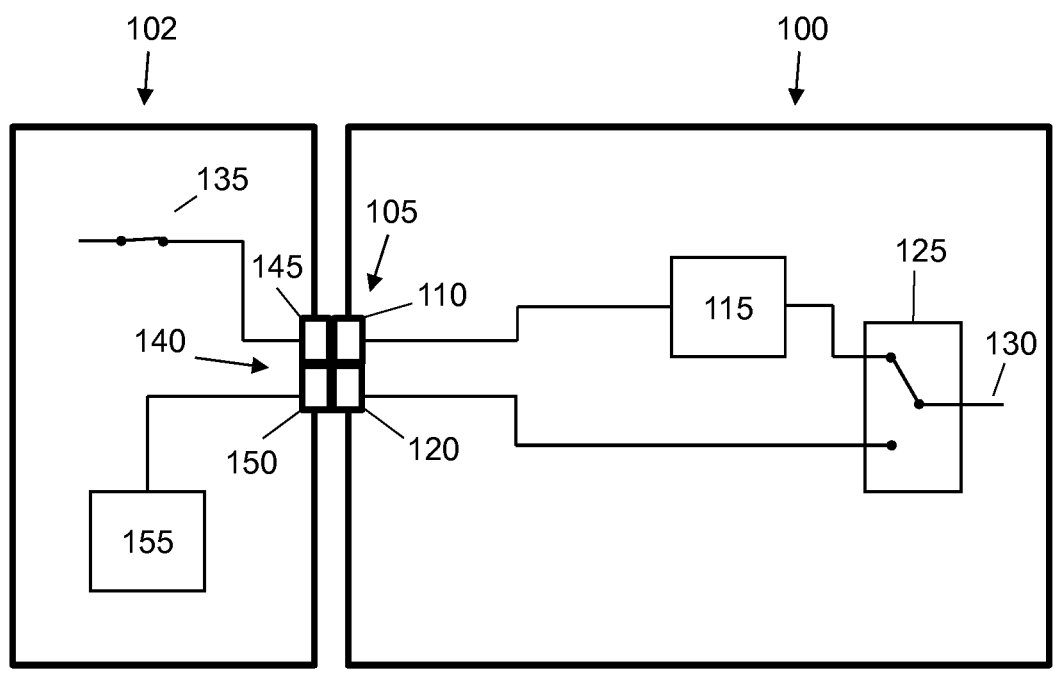
Figure 1D:
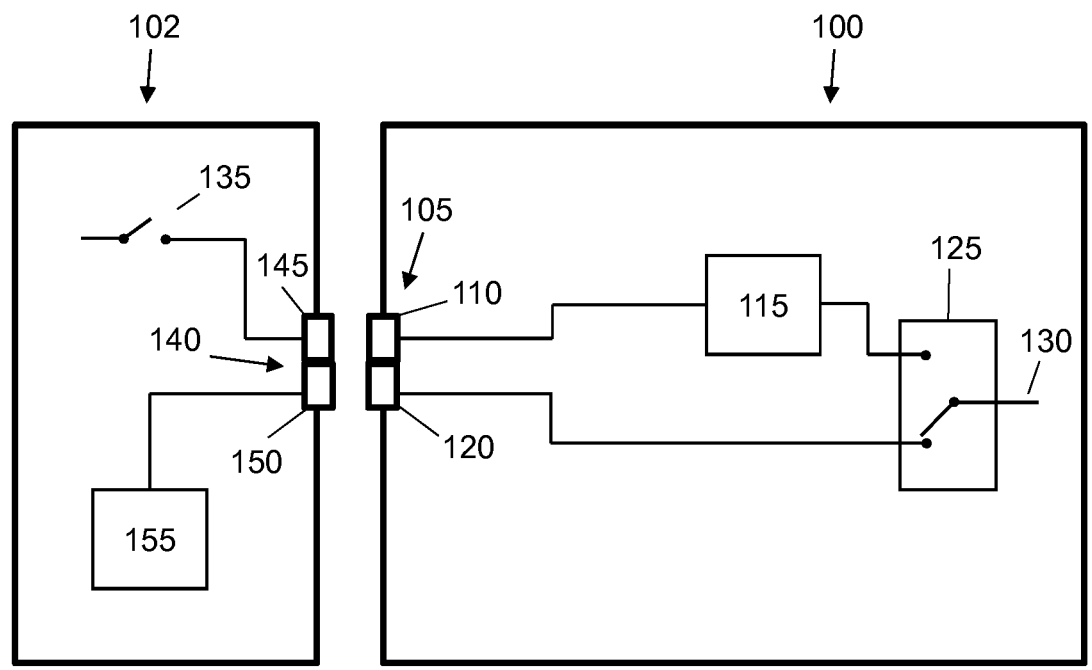

FIGS. 1A to 1D show schematic representations of a removable unit 100 for an additive manufacturing system according to an example. FIG. 1A shows the removable unit 100 on its own. FIGS. 1B and 1C show the removable unit 100 when coupled to a base unit 102. FIG. 1D shows the removable unit 100 following disconnection from the base unit 102. As such, the removable unit 100 is removably couplable to the base unit 102. The base unit 102 may comprise a printing system for depositing printing agents as described above and the removable unit 100 may comprise a build unit, e.g. a build material supply system and/or a build platform upon which an object is constructed, and/or any of the removable systems described above.

With reference to FIG. 1A, the removable unit 100 comprises a power interface 105 to connect the removable unit 100 to the base unit 102. The power interface 105 may comprise a plug or other electrical connector. FIG. 1A also shows, on the left-hand side, an example schematic front view of the power interface 105. The power interface 105 comprises a first power coupling 110 to provide a first voltage (i.e. when connected and operational). The first power coupling 110 may comprise multiple current-carrying pins. In certain cases, the first power coupling 110 may comprise an earthing pin or connector, a live pin or connector and a neutral live pin or connector (depending on the region of implementation). Example pins are shown in the front view of the power interface 105. The first voltage may be an AC mains voltage. The removable unit 100 comprises a power supply unit 115 to convert the first voltage to a second voltage, the second voltage being lower than the first voltage. For example, the second voltage may be a low voltage direct current (DC) voltage. The power supply unit 105 may thus comprise an AC-to-DC power supply. In one case, the power supply unit may conform to an Advanced Technology eXtended (ATX) standard. The power supply unit 115 may comprise at least one of: a transformer, a rectifier or voltage converter, a filter, and a current limiter. In one case the second voltage may comprise a plurality of low voltages, e.g. 3.3V, 5V and 12V supplies.

As well as the first power coupling 110, the power interface 105 comprises a second power coupling 120 to provide the second voltage, i.e. to provide the same voltage that is output by the power supply unit 115 when coupled to the base unit and operational. If the second voltage comprises a plurality of low voltages, at least one of these (and in certain cases, all voltages) may be supplied via the second power coupling 120. To switch between the two sources of the second voltage, the removable unit 100 comprises a power multiplexer 125. FIG. 1A shows a number of square pins that supply power according to one example. The power multiplexer 125 is electrically coupled to the power supply unit 115 and the second power coupling 120. The multiplexer 125 is switchable between receiving the second voltage from the power supply unit 115 when the first voltage is on at the base unit, and receiving the second voltage from the second power coupling 120 when the first voltage is off at the base unit.

An output of the power multiplexer 130 may be electrically connected to at least one electrical component of the removable unit 100. For example, integrated circuits operable using a low voltage DC supply may be coupled to the output 130 of the power multiplexer. These integrated circuits may be configured to check the status of the removable unit 100.

In some examples, where the first power coupling 110 provides an AC power supply, the power supply unit 115 converts the alternating current to a direct current. In this example, the second power coupling 120 provides a direct current.

FIG. 1B shows the removable unit 100 connected to the base unit 102. In FIG. 1B, the base unit 102 comprises a power switch 135. This power switch 135 is operable to turn on and off a high voltage power supply. The power switch may be a relay under the control of a controller on at least one of the base unit and the removable unit. For example, the base unit 102 may be coupled to a high voltage industrial mains supply and the relay may enable or disable this mains supply based on a signal from DC voltage electronics. A mains coupling may be hard-wired, e.g. via a building power line, or via a high voltage plug. The power switch 135 may be configured to switch on and off an AC mains voltage power supply for the base unit 102. In FIG. 1B, the power switch 135 controls the supply of power to a base unit power interface 140 that is arranged to connect to the power interface 105 of the removable unit 100.

The base unit power interface 140 has two power couplings 145, 150 that respectively correspond to the first and second power couplings 110, 120 of the power interface 105 of the removable unit 100 (e.g. using female-male or male-female pins or plugs). A first power coupling 145 of the base unit 102 is electrically connected to the power switch 135 and is arranged to couple with the first power coupling 110 of the removable unit 100, such that an electrical connection is formed to supply the first voltage when the power switch 135 is activated (i.e. closed). For example, the first power couplings may comprise an AC mains voltage plug and socket. In FIG. 1B the base unit power supply is switched off at the base unit 102 and the power switch 135 is open. FIG. 1B thus shows an example configuration of the removable unit 100 and the base unit 102 either just after physical coupling of the units or just before physical decoupling of the units. In certain cases, the power switch 135 may be disabled (i.e. deactivated) when the removable unit is not connected. For example, a mechanical switch may indicate coupling of the base unit and the removable unit and if this switch indicates disconnection a controller of the base unit may deactivate the power switch 135. In FIG. 1B, the switch is off so the first voltage is not available from the base unit via the first power coupling.

In FIG. 1B, when the power interface 105 of the removable unit 100 is connected to the power interface 140 of the base unit 102, e.g. when the removable unit 100 is connected to the base unit 102, the second power coupling 120 of the removable unit 100 is connected to a second power coupling 150 of the base unit. For example, the second power couplings may comprise a DC voltage plug and socket. Although the power interfaces 105, 140 are shown as a single connector unit in FIGS. 1A to 1D, in certain examples the first power couplings and the second power couplings may be located at different positions on the base and removable units, e.g. the power interfaces may be distributed in different regions of the units. In FIG. 1B, the second power couplings 120, 150, when connected, connect the removable unit 100 to a power source 155 of the base unit 102. The power source 155 is configured to supply power at the second voltage. The power source 155 may comprise an ATX standard DC power supply. The power source 155 may also be powered from a mains power supply, e.g. the source may comprise an AC-to-DC power supply. In this case, the second power couplings may comprise a power connector according to an ATX standard and the second voltage may be at least one of a 3, 5 and/or 12 V DC voltage. In one case, the power source 155 may comprise part of a computing system on the base unit 102. The computing system may be configured to control the additive manufacturing process.

In one example, the removable unit 100 may comprise a first electronic component operable at the first voltage and a second electronic component operable at the second voltage (not shown). The first electronic component may be at least one of: a build material supply component, part of a vacuum system such as a pump, part of a heating system such as a lamp, and part of an actuator system such as a motor. The second electronic component may for example be a diagnostic component.

In such a case, the first electronic component may be electrically coupled to the first power coupling 110 of the removable unit 100, whereby to provide a load to the first voltage and draw a current. The second electronic component may then be electrically coupled to the output 130 of the power multiplexer 125, whereby to provide a load to the second voltage and draw a current. As described above, the multiplexer 125 is switched so as to supply the second voltage from the second power coupling 120 when the first voltage is off at the base unit, as shown in FIG. 1B. As such, the second electronic component draws an electric current via the second power coupling 120. This allows the second electronic component to be operated while the first voltage is off. For example, where the second electronic component is a diagnostic component, this allows diagnostic routines to be run before switching on the first voltage, for example to confirm that the removable unit (e.g. the first electrical component) is functioning correctly and thus that it is safe to supply a high voltage. For example, a controller in the base unit or the removable unit may be configured to power the first electrical component using the first voltage, and to switch the power multiplexer to supply the second voltage from the power supply unit, responsive to an output of diagnostic component indicating that a set of diagnostic tests have been passed. In one case, the first voltage may be enabled by activating a relay forming power switch 135, wherein the relay may be activated using low voltage electronic components.

In FIG. 1C, the first voltage is switched on at the base unit, for example by closing the power switch 135 (e.g. when activating a relay). This then provides the first voltage via the connection made by the first power couplings 110, 145. The first voltage is thus available to the power supply unit 115 and any electrical components that use a high voltage. Following a successful connection of the removable unit 100, e.g. if all diagnostic checks are passed, the power switch 135 may be activated and the power multiplexer 125 is switched to supply at output 130 the second voltage from the power supply unit 115, i.e. as opposed to via the second power coupling 120. As such, a second electronic component is able to draw an electric current from an output of the power supply unit 115 rather than from power supply 155. This then reduces the load on the power supply 155. This may be beneficial during subsequent additive manufacturing, wherein other electrical subsystems of the base unit may be powered from the power supply 155. Hence, FIG. 1C shows an example configuration of the removable unit 100 and base unit 102 when both units are connected and the base unit 100 is using the systems of the removable unit 100 (e.g. in an object build process).

FIG. 1D shows an example configuration of the removable unit 100 and the base unit 102 following a physical uncoupling of the two units. For example, after an operational state as shown in FIG. 1C, the configuration in FIG. 1B may be enacted, followed by the configuration in FIG. 1D. The process of changing configurations is described in more detail below.

In one example, removable unit 100 may comprise a controller (not shown) to control the switching of the power multiplexer 125. In one example, the controller is configured to switch the power multiplexer 125 to supply the second voltage via the second power coupling 120 when the first power coupling 110 is not supplied with the first voltage, e.g. when a power supply is switched off in the base unit 102 (i.e. the configuration shown in FIG. 1B). In this example, the controller may be configured to detect an electric current from the base unit power supply, e.g. as drawn via the first power coupling 110 and, responsive to the detecting, switch the power multiplexer 125 to supply the second voltage from the power supply unit 115 (i.e. switch to the configuration shown in FIG. 1C). Alternatively, rather than detect a current, the controller may be configured to measure a voltage, e.g. determine whether the first power coupling 110 is at the first voltage. In one example, the voltage is detected directly, for example by a voltmeter configured to measure the voltage at the first power coupling 110. In another example, the supply of electric current to the first power coupling 110 is signaled to the controller from the base unit 102. In another example, the controller may detect the state of the power switch 135, e.g. based on the state of a relay signal.

In one example, the removable unit 100 comprises a diagnostic system electrically coupled to the output 130 of the power multiplexer. In this example, the controller is configured to conditionally switch the power multiplexer 125 to supply the second voltage from the power supply unit 115 based on an output of the diagnostic system. The controller may also signal to the base unit 102 to switch on the first voltage based on an output of the diagnostic system, e.g. enable the closing of power switch 135 if diagnostic checks are passed. For example, the diagnostic system may determine that all components of the removable unit 100 are functioning correctly and then, responsive to this determination, signal to the base unit 102 to switch on the first voltage and switch the power multiplexer 125 to supply the second voltage from the power supply unit. The signal to the base unit may for example be transmitted by a Controller Area Network (CAN) bus. In one case, as a safety feature, the power switch 135 may be disabled and the power supply switched off until the diagnostic checks are passed. In this case, the power supply 155 enables diagnostic electronics to perform tests even though the first voltage is not supplied to the power supply unit 115. For example, the configuration in FIG. 1C may be available dependent on a success set of diagnostic checks.

The controller may be configured to detect that the first power coupling 110 is receiving no electric current from the base unit 102. Responsive to this detecting, the controller may switch the power multiplexer 125 to supply the second voltage from the second power coupling 120 (i.e. to return the system to the configuration shown in FIG. 1B from the configuration shown in FIG. 1C). Similarly as described above, in one example, a voltage or current from the base unit 102 may be detected directly, for example by a voltmeter and/or ammeter configured to measure a voltage or electric current at the first power coupling 110. In another example, an interruption of the supply of voltage or electric current to the first power coupling 135 is signaled to the controller from the base unit 102. This allows post-disconnection diagnostics to be run, for example to confirm that no components of the removable unit 100 were damaged during a print run. Physical decoupling of the removable unit 100 may be prevented until these diagnostic tests are successfully passed, e.g. passing from the configuration of FIG. 1B to the configuration of FIG. 1D may be dependent on the result of a diagnostic system. If all tests are passed, the removable unit 100 may then be physically disconnected from the base unit 102, as shown in FIG. 1D.

Figure 2:
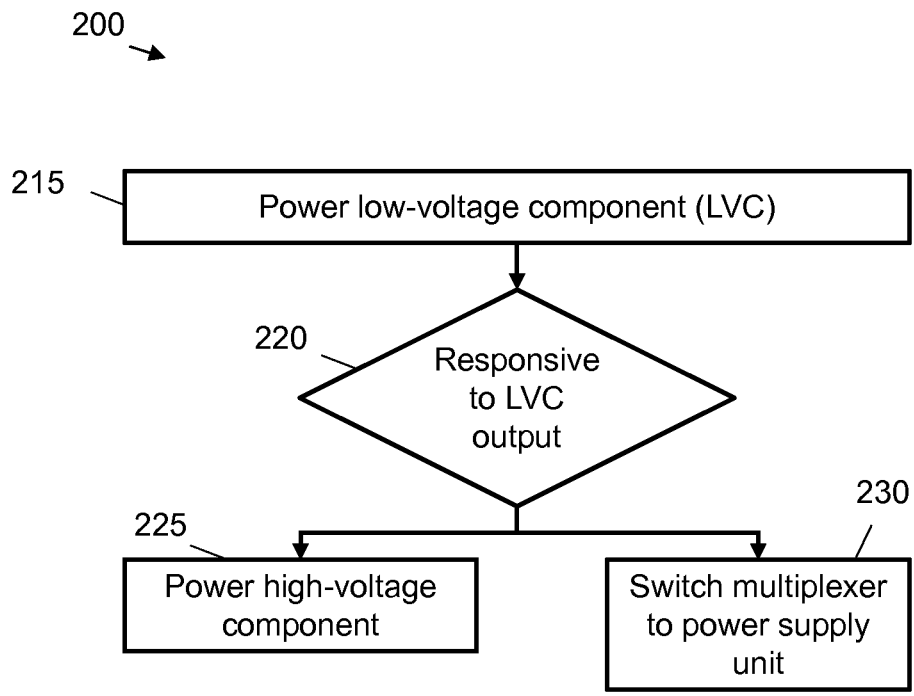
FIG. 2 shows a schematic representation of a method for powering a removable unit in an additive manufacturing system according to an example.

FIG. 2 is a flowchart showing a method 200 for powering a removable unit in an additive manufacturing system. It may be applied to a system such as that shown in FIGS. 1A-1D.

In use, the removable unit is connected to a base unit. The base unit may comprise a power supply. Connecting the removable unit may comprise connecting a high voltage source to a high voltage power line of the removable unit and connecting a low-voltage source to a low voltage power line. In this case, the low voltage power line is "low voltage" in that it supplies a lower voltage than the high voltage power line. In one case, the high voltage source may comprise a mains voltage, e.g. a three-phase AC power supply at 380 to 415 V, 50/60 Hz with a maximum current of 30 A or at 200 to 240 V, 50/60 Hz with a maximum current of 48 A. The low voltage power line may supply a low voltage in the form of a DC voltage at plus or minus 3, 3.3, 5 and/or 12 V. A maximum current on the low voltage power line may be 8 or 10 A.

Connecting the removable unit to the base unit may comprise physically connecting a power interface of the removable unit to a power interface of the base unit (e.g. may comprise connecting power interfaces such as 105, 140 in FIGS. 1A to 1D). Alternatively or additionally, connecting the removable unit to the base unit may comprise an electrical connection, for example by closing a switch. The switch may be manually operated (e.g. a physical switch) or be controlled by a processor of the base unit (e.g. a relay or the like). In some examples, the base unit may comprise a printing agent deposit unit for the additive manufacturing system, e.g. an inkjet system for depositing printing agents as part of an additive manufacturing process.

Turning to FIG. 2, at block 215, a low-voltage component is powered via an output of a power multiplexer electrically coupled to the low-voltage power line. This may comprise powering integrated circuits or processors configured to determine a state of the removable unit, e.g. via at least one sensor or via communications on a systems bus. The low voltage component may for example be a diagnostic component as described above. The power multiplexer may be similar to multiplexer 125 in FIGS. 1A to 1D.

At block 220, an output of the low-voltage component is checked. If the output indicates that the removable unit is able to be activated then at block 225 a high-voltage component of the removable unit is powered via the high-voltage power line. For example, if the output of the low-voltage component indicates that a number of diagnostic tests have completed successfully then a relay may be activated to switch on the high voltage source. The high-voltage component may for example be part of a build unit or one of the systems described above.

At block 230, responsive to an output of the low-voltage component, the power multiplexer is also switched to a converted voltage power line. The converted voltage power line supplies an output voltage from a power supply unit electrically coupled to the high-voltage power line (e.g. power supply unit 115 in FIGS. 1A to 1D).

In certain examples, the method may comprise using the low-voltage component to run a diagnostic check on the removable unit, wherein powering a high voltage component and/or switching the power multiplexer to a converted voltage power line is performed responsive to the output of the low-voltage component indicating a successful diagnostic check. For example, the diagnostic check may comprise checking that components of the removable unit are functioning correctly and that it is safe to connect the high voltage power supply.

In some examples, the method comprises a disconnection routine. One such disconnection routine comprises switching off the high-voltage source at the power supply, for example by way of a switch or relay such as 135, and switching the power multiplexer from the converted voltage power line to the low-voltage power line. These operations may be performed simultaneously. Alternatively, the high-voltage source may be switched off first, followed by switching the multiplexer. As a third alternative, the multiplexer may be switched first, followed by switching off the high-voltage power supply. This then enables the removable unit to perform power-down checks before the unit is physically disconnected. For example, a state of electromechanical components of the removable unit may be detected. If the state indicates that the removable unit is safe to disconnect then the disconnection routine may then comprise physically disconnecting the power interface of the removable unit from the power interface of the power supply. Alternatively or additionally, the disconnection procedure may comprise electrically disconnecting the power interface of the removable unit from the power supply, for example by opening the switch. In certain cases, diagnostic checks may be safely performed after a mains power source is deactivated. If any errors in the state of the removable unit are detected, these may be signaled to a user of the additive manufacturing system prior to disconnection. In certain cases, a recovery routine may be activated before the removable unit is physically disconnected. This recovery routine may be performed by low voltage components and/or may comprise re-activating a mains power supply (if it is safe to do so).

Figure 3:
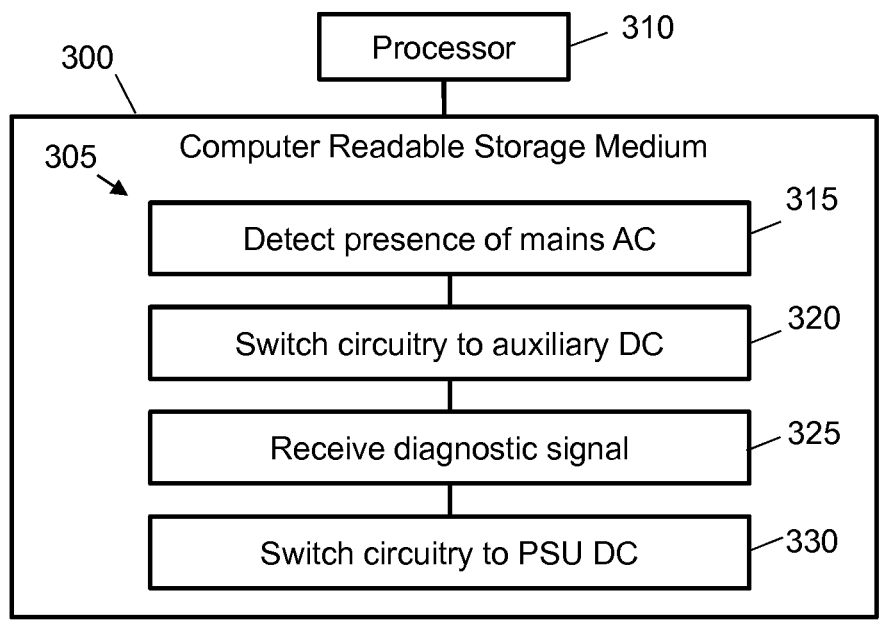
FIG. 3 is a schematic diagram showing an example set of set of computer-readable instructions within a non-transitory computer-readable storage medium.

FIG. 3 shows an example of a non-transitory computer-readable storage medium 300 comprising a set of computer readable instructions 305 which, when executed by at least one processor 310 of an additive manufacturing system, cause the processor 310 to perform a method according to examples described herein. For example, the processor 310 may form part of the removable unit 100 shown in FIGS. 1A to 1D, e.g. in the form of a controller as described above. The computer readable instructions 305 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 315, the instructions 305 cause the processor 310 to determine a state of an alternating current (AC) mains power supply for a removable unit of the additive manufacturing system. For example, the processor may be configured to sense a current and/or a voltage present at a power interface. Sensing may be performed by processing a signal from circuitry configured to sense a current and/or voltage. Alternatively, a state of the mains power supply may be detected using a state of a relay signal, e.g. a signal used to control power switch 135 in FIGS. 1B to 1D.

At block 320, the instructions cause the processor 310 to, responsive to the mains power supply being disabled, switch circuitry of the removable unit to use an auxiliary direct current (DC) power supply. This switching may for example comprise switching a power multiplexer as described above. The mains power supply may be disabled if a relay is deactivated.

At block 325 the instructions cause the processor 325 to receive a diagnostic signal from the circuitry. In certain cases, this may be performed responsive to the mains power supply being on.

At block 330 the instructions cause the processor 325 to, responsive to the diagnostic signal indicating successful operation, enable the mains power supply and switch circuitry of the removable unit 100 to use a DC power supply that is generated from the mains power supply. For example, the processor 325 may activate a relay that controls power switch 135 to switch on the mains power supply.

The instructions 305 shown in FIG. 3 may be processed by a processor embedded within the removable unit when the removable unit is physically coupled to a base unit. In certain cases, the processor 310 may form part of the base unit and may receive electronic signals from the removable unit. Blocks 315 and 320 may be enacted continuously during operation of the additive manufacturing system, e.g. when the removable unit is coupled to the base unit. Block 325 may also be enacted during operation, such that if a diagnostic signal indicates abnormal operation, block 315 may be triggered, switching back to the auxiliary direct current (DC) power supply. In certain cases, the diagnostic signal may be sent over a CAN bus to a processor within a base unit. In one example, the processor 310 may be a processor of the base unit configured to remotely control operation of a coupled removable unit, e.g. receive diagnostic signals from the unit over the CAN bus and send control signals back over the bus to control electrical and/or electro-mechanical components of the removable unit.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A removable unit for an additive manufacturing system comprising:
    a power interface to connect the removable unit to a base unit, the power interface comprising a first power coupling to provide a first voltage; and
    a power supply unit to convert the first voltage to a second voltage, the second voltage being lower than the first voltage;
    wherein the power interface comprises a second power coupling to provide the second voltage, and
    wherein the removable unit comprises:
    a power multiplexer, electrically coupled to the power supply unit and the second power coupling, switchable between:
        the power supply unit when the first voltage is available at the first power coupling, and
        the second voltage from the second power coupling when the first voltage is not available at the first power coupling.

2. The removable unit of claim 1, wherein:
    the first power coupling provides an alternating current,
    the second power coupling provides a direct current, and
    the power supply unit comprises an alternating-current to direct-current power supply to provide a direct current.

3. The removable unit of claim 1, comprising a first electrical component operable at the first voltage and a second electronic component operable at the second voltage, wherein:
    the first electrical component is electrically coupled to the first power coupling, whereby to provide a load to the first voltage; and
    the second electronic component is electrically coupled to an output of the power multiplexer, whereby to provide a load to the second voltage.

4. The removable unit of claim 3, wherein the first electrical component is at least one of:
    a build material supply component;
    a vacuum component;
    an electro-mechanical actuator;
    a heating component; and
    a cooling component.

5. The removable unit of claim 3, wherein the second electronic component is a diagnostic component.

6. The removable unit of claim 5, comprising:
    a controller to power the first electrical component using the first voltage, and to switch the power multiplexer to supply the second voltage from the power supply unit, responsive to an output of diagnostic component indicating that a set of diagnostic tests have been passed.

7. The removable unit of claim 1, wherein the first voltage is a mains voltage.

8. The removable unit of claim 1, comprising a controller, wherein the controller is configured to:
switch the power multiplexer to supply the second voltage from the second power coupling when a relay at the base unit is disabled; and
responsive to the relay at the base unit being activated, switch the power multiplexer to supply the second voltage from the power supply unit.

9. The removable unit of claim 8, wherein the controller is configured to:
enable the relay at the base unit responsive to a signal indicating that components of the removable unit are operational.

10. The removable unit of claim 1, wherein the power supply unit is connected to the power interface to receive the first voltage from the power interface.

11. The removable unit of claim 1, further comprising a diagnostic component to apply diagnostic testing within the removable unit, the power multiplexer being controlled by output of the diagnostic component.

12. The removable unit of claim 11, wherein the diagnostic component is to poll at least one electronic component within either the removable unit or the base unit and to provide output based on whether communication with the at least one electronic component is successful.

13. The removable unit of claim 1, wherein the power interface comprises a plug that incorporates both the first and second power couplings.

14. The removable unit of claim 1, wherein the multiplexer is to operate responsive to output of a low voltage component of the removable component.

15. A method for powering a removable unit in an additive manufacturing system, the removable unit being couplable to a base unit, the removable unit comprising a high voltage power line connectable to a high voltage source of the base unit and a low voltage power line connectable to a low voltage source of the base unit, the method comprising:
powering a low voltage component of the removable unit via an output of a power multiplexer electrically coupled to the low voltage power line; and
responsive to an output of the low voltage component:
switching the power multiplexer to a converted voltage power line, the converted voltage power line supplying an output voltage from a power supply unit of the removable unit, the power supply unit being electrically coupled to the high voltage power line; and
powering a high voltage component of the removable unit via the high voltage power line.

16. The method of claim 15, comprising:
detecting a physically coupling of a power interface of the removable unit to a power interface of the base unit.

17. The method of claim 15, comprising:
switching off the high voltage source at the base unit; and
switching the power multiplexer from the converted voltage power line to the low-voltage power line.

18. The method of claim 15, wherein the base unit comprises a printing agent deposit unit for the additive manufacturing system.

19. The method of claim 15, comprising:
using the low-voltage component to run a diagnostic check on the removable unit,
wherein switching the power multiplexer to a converted voltage power line is performed responsive to the output of the low voltage component indicating a successful diagnostic check.

20. A non-transitory computer-readable storage medium comprising a set of computer-readable instructions stored thereon which, when executed by at least one processor of an additive manufacturing system, cause the at least one processor to:
determine a state of an alternating current (AC) mains power supply for a removable unit of the additive manufacturing system;
responsive to the mains power supply being disabled,
switch circuitry of the removable unit to use an auxiliary direct current (DC) power supply; and
receive a diagnostic signal from the circuitry, and
responsive to the diagnostic signal indicating successful operation,
enable the mains power supply, and
switch the circuitry of the removable unit to use a DC power supply that is generated from the mains power supply.

* * * * *